United States Patent [19]
Smith, Jr. et al.

[11] 3,781,578
[45] Dec. 25, 1973

[54] STATOR STRUCTURE FOR ELECTRICAL MACHINE

[75] Inventors: Joseph L. Smith, Jr., Concord; Philip Thullen, Dover; James L. Kirtley, Jr., Brighton, all of Mass.

[73] Assignee: Massachusetts Institute of Technology, Cambridge, Mass.

[22] Filed: Aug. 9, 1972

[21] Appl. No.: 279,034

[52] U.S. Cl.................... 310/52, 310/61, 310/254
[51] Int. Cl. ............................................ H02k 1/32
[58] Field of Search .................. 310/10, 40, 43, 45, 310/51, 54, 52, 91, 254, 61, 183; 248/17

[56] References Cited
UNITED STATES PATENTS

| | | | |
|---|---|---|---|
| 3,289,019 | 11/1966 | Buchhold | 310/52 |
| 3,368,087 | 2/1968 | Madsen | 310/52 X |
| 3,239,697 | 3/1966 | Stekly | 310/11 |
| 2,043,120 | 6/1936 | Punga et al. | 310/61 |
| 3,098,941 | 7/1963 | Willyoung | 310/54 X |
| 3,621,315 | 11/1971 | Vasteras et al | 310/183 |
| 2,712,085 | 6/1955 | Willyoung | 310/61 X |
| 1,819,860 | 8/1931 | Belfils | 310/61 |

Primary Examiner—J. D. Miller
Assistant Examiner—Mark O. Budd
Attorney—Joseph S. Iandiorio et al.

[57] ABSTRACT

A stator structure for a cryogenic electrical machine including a non-conducting inner support shell; a stator winding unit carried by and fixed to the inner support shell and including a central part in which the stator winding conductors extend axially along the inner support shell, two end parts each having a transverse section in which the conductors extend transversely to their axial direction, an intermediate section in which the conductors extend between an end part and the central part, and an end connection section in which the conductors are interconnected in a predetermined pattern; and a non-conducting outer torque shell having transversely extending filaments surrounding and fixed to the stator winding.

7 Claims, 9 Drawing Figures

PATENTED DEC 25 1973

PATENTED DEC 25 1973 3,781,578
SHEET 2 OF 4
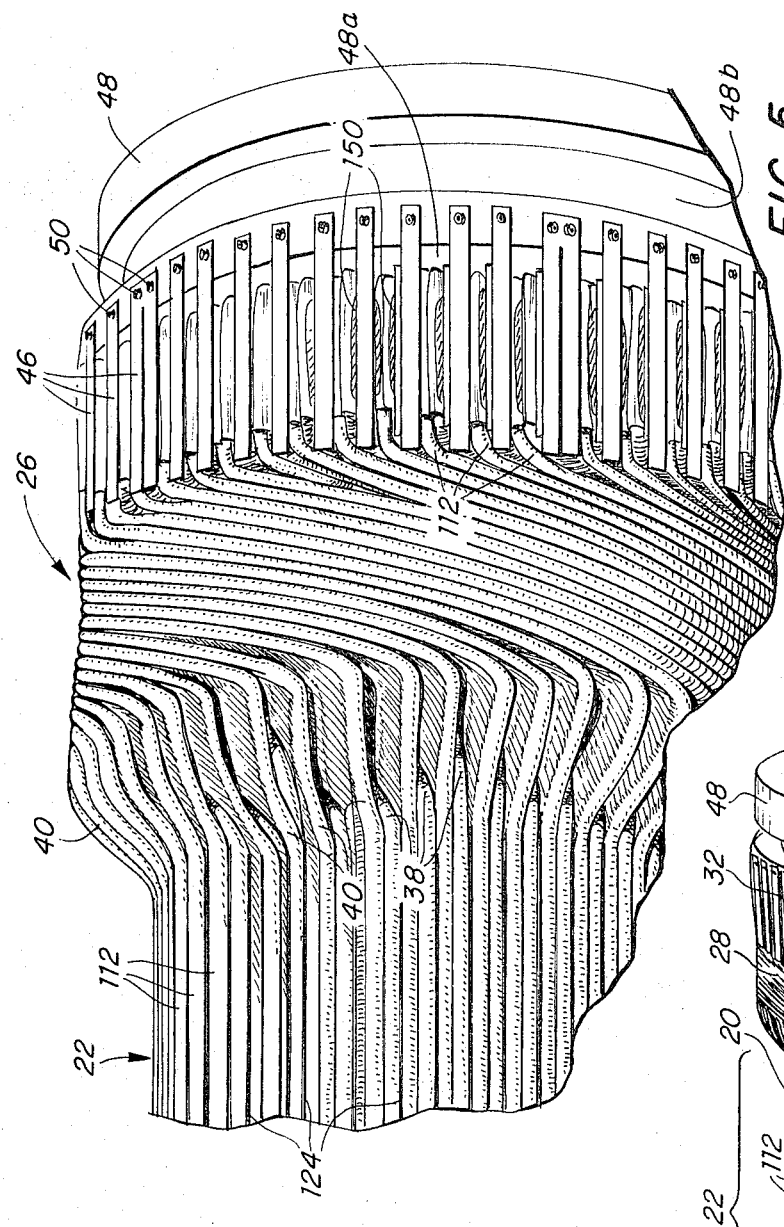
FIG. 5.
FIG. 4.
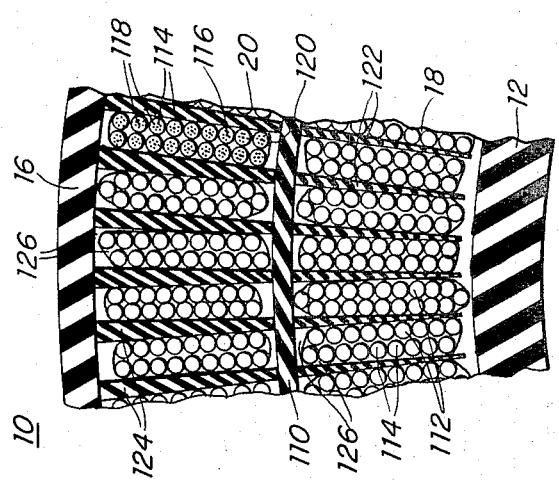
FIG. 3.

3,781,578

STATOR STRUCTURE FOR ELECTRICAL MACHINE

FIELD OF INVENTION

This invention relates to a stator structure for a cryogenic electrical machine, and more particularly to such a stator structure for use in the absence of the conventional magnetic iron support structure present in conventional machines.

BACKGROUND OF INVENTION

When superconductors are employed to produce the magnetic field in an electrical machine, the magnetic iron circuit, normally employed in electric machines, is not needed. Magnetic iron is useful, if at all, only for magnetic shielding. The elimination of the iron teeth around each conductor bar creates the potential for higher effective current densities in the windings. This is so because the space previously occupied by iron teeth can now be filled with additional conductors. Further the removal of the iron which was at the electrical potential of the machine ground reduces the amount of insulation required for turn to turn differences in potential as compared to the phase to ground differences in potential. It also creates the potential for an increase in the terminal voltage or a reduction in the volume of electrical insulation as explained in Polyphase Synchronous Alternators Having A controlled Voltage Gradient Armature Winding, Smith et al., Ser. No. 166,083, Filed July 26, 1971. The elimination of the iron in the machine also eliminates the slots which have conventionally been employed to support the conductors against the magnetic forces present in the machine.

SUMMARY OF INVENTION

It is therefore an object of this invention to provide a new and improved stator structure which eliminates the need for electrically conducting structural iron to combat the magnetic forces acting on the stator winding conductors.

It is a further object of this invention to provide such an improved stator structure in which the stator winding and the adjacent supports form a monolithic structure.

It is a further object of this invention to provide such an improved stator structure which is supported either at its ends through the mechanical frame of the machine or intermediate its ends by a non-conducting resilient strap and pin support or both.

The invention features a stator structure for a cryogenic electrical machine including a non-conducting inner support shell, a stator winding unit carried by and fixed to the inner support shell and a non-conducting other torque shell having transversely extending filaments surrounding and fixed to the stator winding. The stator winding unit includes a central part in which the stator winding conductors extend axially along the inner support shell, two end parts each having a transverse section in which the conductors extend transversely to their axial direction, an intermediate section in which the conductors extend between an end part and a central part and an end section in which the conductors are interconnected in a predetermined pattern.

DISCLOSURE OF PREFERRED EMBODIMENT

Other objects, features and advantages will occur from the following description of a preferred embodiment and the accompanying drawings, in which:

FIG. 3 is an enlarged, fragmentary, diagrammatic, cross-sectional view taken along lines 3—3 of FIG. 1 showing the conductors in position between the inner support shell and the outer torque shell;

FIG. 4 is an axonometric view of the stator winding unit with the outer torque shell removed;

FIG. 5 is an enlarged axonometric view of an end part of the stator structure according to this invention;

Figure 1:
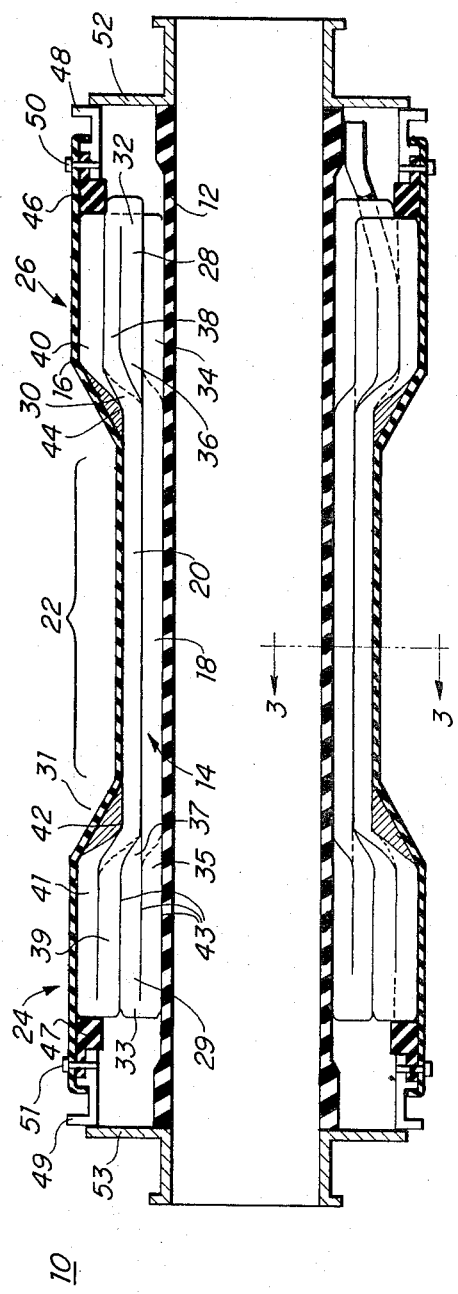
FIG. 1 is a diagrammatic, cross-sectional, elevational view of a stator structure according to this invention.

There is shown in FIG. 1 a stator structure which in this embodiment is actually an armature structure 10 and will be so referred to hereinafter. Armature structure 10 includes an inner support shell 12 typically made of an insulating material such as fabric reinforced phenolic or fiberglass reinforced epoxy; inner support shell 12 carries on it an armature winding unit 14 which is surrounded by an outer insulating torque shell 16. Armature winding unit 14 includes one or more conductor layers 18, 20 and includes a central part 22 and two end parts 24 and 26. Each layer includes a plurality of insulated conductors which extend axially along inner support shell 12 in the vicinity of central part 22. End part 26 includes a transverse section 28 in which the conductors extend transversely to their direction in the central part 22, an intermediate section 30 interconnecting central part 22 and transverse section 28 and an end section 32. Similarly, end part 24 includes a transverse section 29, intermediate section 31 and end section 33. In intermediate section 30 conductor layer 18 may be split into two sublayers so that it forms one sublayer 34 which lies along inner shell 12 and a second sublayer 36 which flares outwardly so that there is approximately the distance of one layer between it and inner shell 12. Layer 20 may be similarly divided to produce portions 38 and 40. Similarly in intermediate section 31 conductor layer 18 may be split so that it forms one sublayer 35 which lies along inner shell 12 and a second sublayer 37 which flares outwardly. Layer 20 is similarly divided to produce portions 39 and 41. The extra space provided by this flaring technique is provided to accommodate certain geometric constraints which are discussed in more detail in the copending application Polyphase Synchronous Alternators Having A Controlled Voltage Gradient Armature Winding, filed July 26, 1971, Ser. No. 166,083, by Joseph L. Smith, Jr. and James L. Kirtley, Jr. Insulating bonding material 43 is provided around each conductor in layers 18 and 20, in central part 22 and at end parts 24 and 26. Fillets, 42, 44 may be provided at each end of central part 22 if the flared portions at intermediate sections 30, 31 are steeper than desirable for forming torque shell 16. In end part 26 armature structure 10 includes a plurality of end spacers 46 which are arranged circumferentially about armature structure 10 interstitially with the conductors which make up conductor layers 18 and 20. End spacers 46 are joined to a torque member such as torque flange 48 by means of bolts 50 which also serve as anchoring means for the outer torque shell 16. An end flange 52 may also be provided for supporting the unitary, monolithic armature structure 10. End part 24 contains similar end spacers 47, torque flange 49, bolts 51 and end flange 53.

Figure 2:
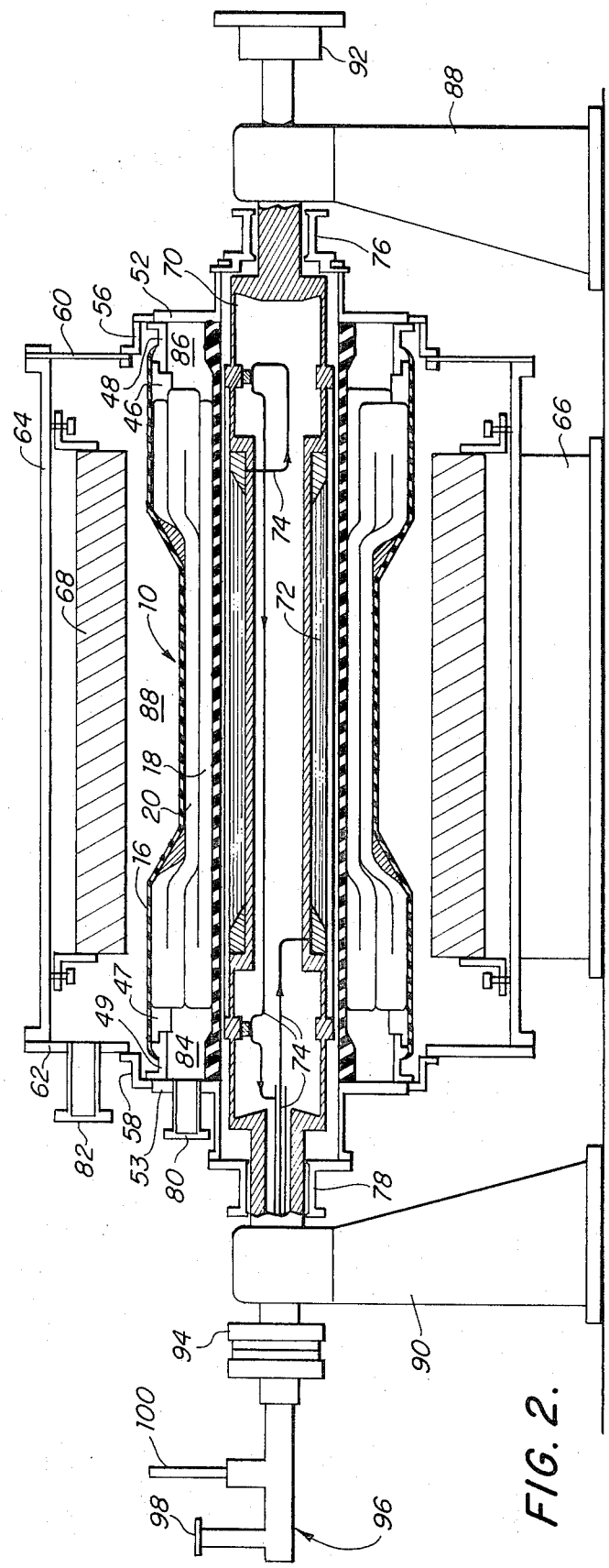
FIG. 2 is a diagrammatic, elevational view shown with parts in cross-section of a superconducting alternator using a stator structure according to this invention.

Before discussing armature structure 10 in more detail in FIGS. 3 et seq. a brief description of the machine system in which armature structure 10 is positioned follows with reference to FIG. 2. End flanges 52 and 53 are connected to additional flanges 56 and 58, respectively, which are in turn supported on additional flanges 60 and 62, respectively, which are mounted to the outer cylindrical frame 64 that rests on base 66. Frames 64 may be designed to function as an image shield to contain the magnetic field within the machine or an iron shield 68 may be used for that purpose. Within the stator armature structure 10 is located the rotor 70 which carries the field structure; rotor 70 includes cryogenic field winding 72 and assorted helium plumbing 74 which maintains the field winding in a supercooled state. A pair of vacuum seal housings 76, 78 at either end of rotor 70 are connected to flanges 52 and 53, respectively. Flanges 53 and 62 may have an oil inlet port 80 and an oil outlet port 82, for enabling oil coolant to pass through space 84, through the conductors in conductor layers 18 and 20, through space 86, through space 88 and back again out through the outlet 82 to provide a measure of cooling and insulation for the conductors in layers 18 and 20. Bearings 88 and 90 rotatably support rotor 70 at either end; at the end proximate bearing 88 there is a coupling 92 for connection to the prime mover, and at the end proximate bearing 90 there is a slip ring assembly 94 and a helium transfer system 96 having a helium inlet 98, an outlet 100 for supplying and recovering helium used to cool the field winding 72 and interior of rotor 70.

There is shown in FIG. 3 a fragmentary, cross-sectional view taken along lines 3—3 of FIG. 1 with an additional component, intermediate shell 110, shown positioned between conductor layer 20 and conductor layer 18. Outer torque shell 16 is typically formed of filament wound fiberglass set in an epoxy resin; there should be at least two sets of filaments which are alternately wound transversely about the tube to place reinforcing filaments near the principle stress directions to transmit the torque along the shell. This alternating transverse winding may be helical in nature. That is, including filaments which are wound in both right hand and left hand helixes. Additional sets of circumferentially wound filaments may also be used. Intermediate shell 110 may either be made of a filament wound glass with epoxy resin or may be a fabric reinforced phenolic substance such as used in inner shell 12.

Conductor layers 18 and 20 may be made up of a plurality of conductor bars 112, each of which is formed of a number of conductor bundles 114. Each of the conductor bundles 114 may include a number of individual strands such as the seven strands 116. Each of conductor bundles 114 is wrapped in an insulating tape 118, and each conductor bar 112 formed of a group of conductor bundles 114 is also wrapped in an insulating tape 120. Tapes 118 and 120 may be a polyester and glass filament type tape with B stage epoxy resin such as sold under the trademark Fusaflex by General Electric. Such tape melts when subjected to sufficient heat and then reforms to fuse the bundles and the bars into one monolithic structure. Since each successive conductor layer occupies a successively greater circumferential area, some wedging means are required to fill the cross-sectional space which increases with increasing radius and to secure the conductor bars in position. Such wedging means may include the bars themselves if they are made wedge shaped. In FIG. 3 such wedging means are provided in conductor layer 18 by means of tapered elements 122 which taper to effectively zero at their lower ends and in conductor layer 20 by tapered elements 124 which taper from a larger to a smaller cross-section toward the center of the structure. Tapered elements may be provided within the conductor bars as well as between them. The conductor bars 114 may be bonded to adjacent tapered elements to further increase the strength of armature structure 10. Conductor bars 112 may also be bonded to outer torque shell 16, intermediate shell 110 and inner support shell 12 to further increase the strength of armature structure 10. There may be one or more intermediate shells such as intermediate shell 110 between each of several layers of conductors or they may be omitted as shown in FIG. 2 depending upon the overall design of the machine. Between and around conductor bundles 114 are spaces 126 which may be used as cooling passages or alternatively conduits may be installed specifically to provide for the flow of oil or other cooling fluid.

In FIG. 4 there is shown the axially extending conductor bars 112 of conductor layer 20 in the area of central part 22. Between conductor bars 112 can be seen the interstitially placed tapered elements 124. In FIG. 4 the flared portions 40, 41 of conductors 112 in conductor layer 20 are more clearly shown and between them can be seen the non-flared portions 38 and 39, respectively. In each of transverse sections 28 and 29 the conductor bars take on a helical path and then once again return to an axial path in end sections 32 and 33 where they are gripped by end spacers 46 and 47, respectively. Some sublayers follow right hand and some left hand helical paths. End spacers 46 and 47 are shown attached to the torque flanges 48 and 49 by bolts 50 and 51.

The end sections 32 and 33 are physically separated from torque flanges 48 and 49 by the spaces 48a and 49a but the torque shell 16 extends across those spaces 48a, 49a to provide a mechanical connection between end sections 32 and 33 while maintaining electrical insulation between end sections 32, 33 and the grounded torque flanges 48, 49. The individual filaments of torque shell 16 loop down into the grooves 48b, 49b on torque flanges 48 and 49 and weave about the bolts 50, 51 and other projections to securely lock the torque flanges 48, 49 to the torque shell 16.

Figure 6:
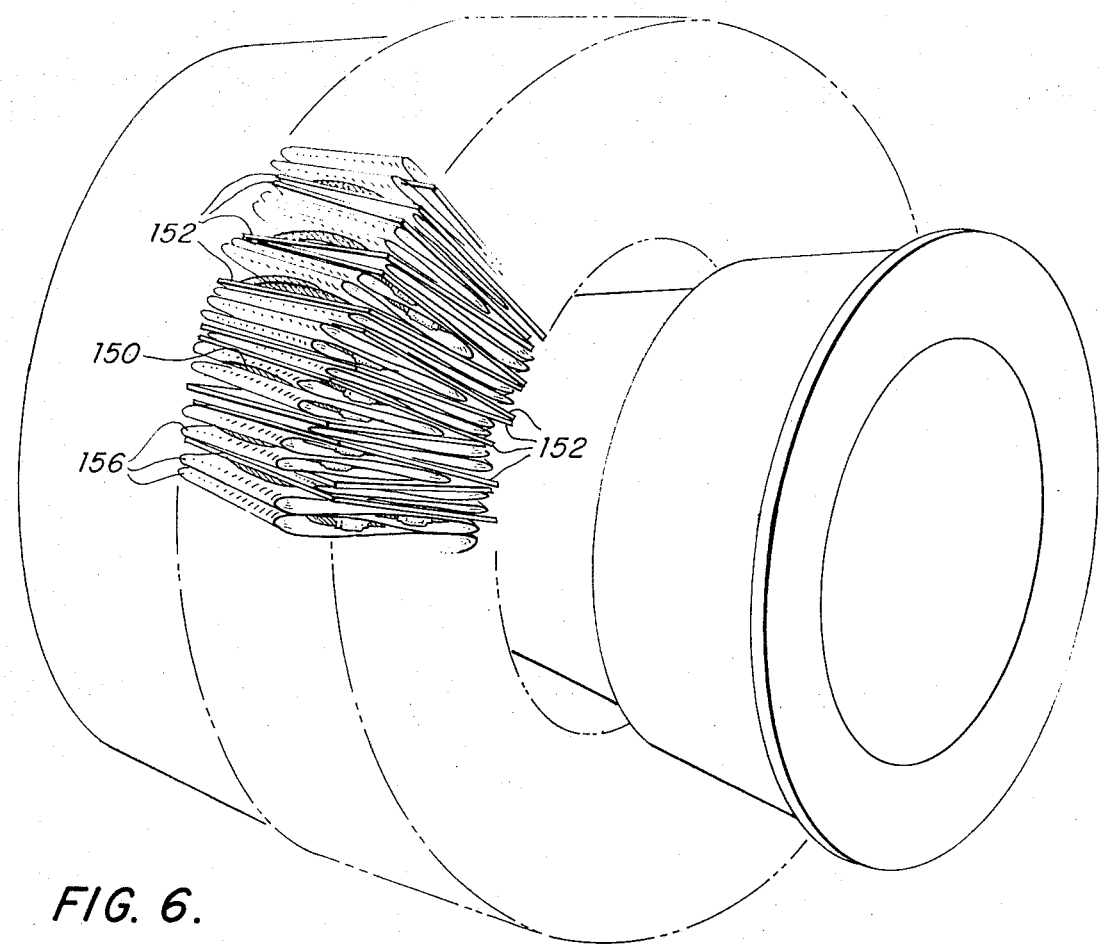
FIG. 6 is a fragmentary, enlarged, axonometric end view of the stator structure according to this invention showing an end section in more detail.
Figure 7:
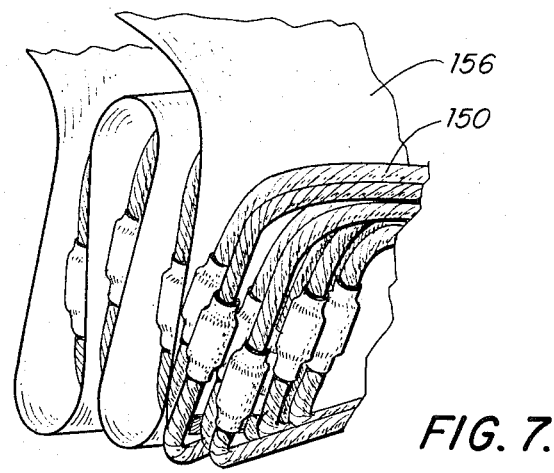
FIG. 7 is a fragmentary, enlarged, axonometric, end view showing the insulation and bonding details in an end section according to this invention.

The enlarged view of FIG. 5 shows the arrangement of conductors 112 and tapered elements 124 in central part 22 and also shows more clearly the distinction between the flared portions 40 (and 41) and the non-flared portions 38 (and 39). In between each pair of fingers 46 are the upwrapped end connections 150 of each conductor bar. Between these connections 150 are spacer elements 152 which are made of material such as phenolic. Between spacer elements 152 the end connections 150 are wrapped in a tape 156, FIG. 6, which may be a tape such as the Fusaflex tape referred to earlier as usable in other parts of the armature structure 10. A set of end connections 150 may be seen more clearly in the enlarged view of FIG. 7 where the wrapping technique with the tape 156 is shown as a zig-zagging technique wherein the tape 156 is unwrapped over one set of end connections 150, under the next set of end connections 150, over the next set of end connections 150, and so on around the armature structure.

Figure 8:
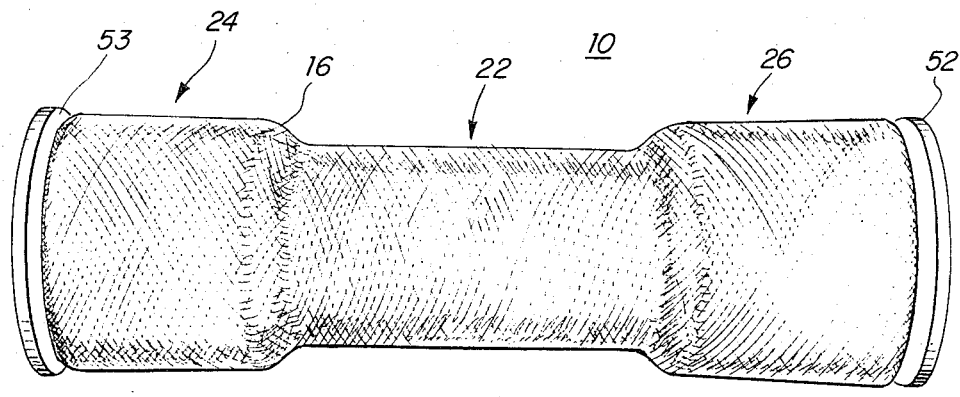
FIG. 8 is a side, elevational view of the stator structure according to this invention with the outer torque shell installed.

When completed, armature structure 10 appears as shown in FIG. 8 completely covered by the outer torque shell 16 typically made with a filament glass with an epoxy resin so that at least a portion of the filaments extend transversely or helically about the armature structure 10 to provide resistance to torque which the armature structure will be subjected to in use.

This construction produces good local mechanical strength from the conductor bars which run in the axial direction and from the insulating tape which is wound around the individual strands and around the conductor bars. The bonding material, such as the epoxy resin on the tape in this illustrated embodiment, serves to transmit the stresses from insulation to insulation and from conductor to insulation. The gross circumferential strength results from the outer, inner and intermediate shells which are those illustrated, supra, as being formed of glass fiber and epoxy resin. Increased torsional strength results from the transverse or helical path taken by the filaments in the outer torque shell and the gross axial strength results from the outer and inner shells as well as the axially extending conductor bars. The same layered construction used in the central part 22 or active length of the machine is continued right through the end section of the armature windings so that the end section is integral with the active length or central part of the machine and with the entire structure. The resulting monolithic armature structure and armature winding are effectively homogenous on a large scale so that no allowance for thermal or elastic motion needs to be provided between the conductor bars and the mechanical supports. In effect the winding is self-supporting so that the elastic and thermal strains are uniformly distributed.

Figure 9:
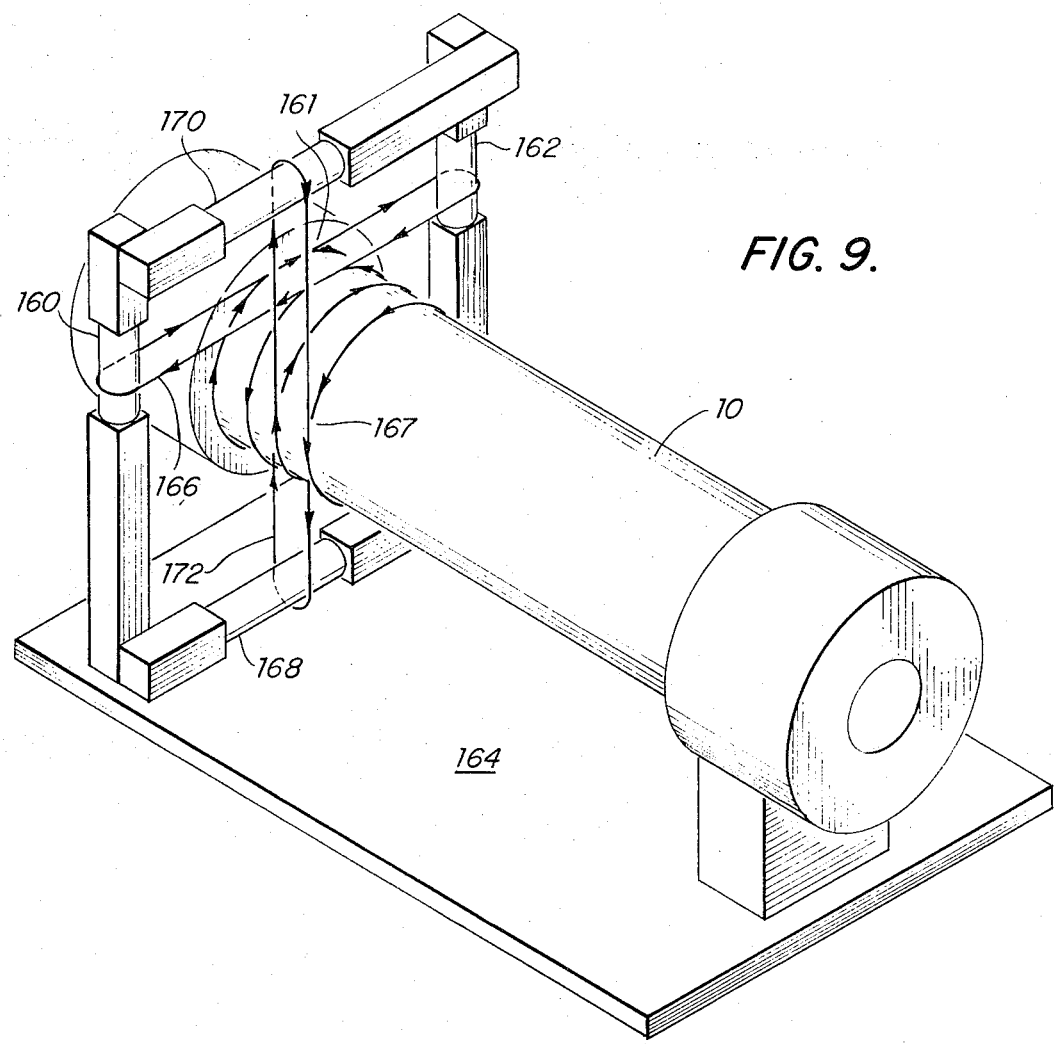
FIG. 9 is a diagrammatic, axonometric view of an alternative support for the stator structure according to this invention.

In addition to or in lieu of the support of armature structure 10 by means of end flanges 52 and 53, two pin and strap arrangements 161, 167 may be used, FIG. 9; pin and strap arrangement 161 includes a first pair of pins 160, 162 typically mounted in the base of platform 164. A strap 166 is formed by winding insulating filaments around pin 160, then one full time around armature structure 10, then around pin 162, then a second full time around structure 10 and then back around pin 160. This winding cycle is continued until strap 166 is built up to required strength. The filaments are bonded together with a binder such as epoxy. Second pin and strap arrangement 167 includes a second set of pins 168 and 170, arranged transversely to the first, and a strap 172 which is wound over pin 168 and then follows around armature structure 10 one full time and then is wound over pin 170, back around structure 10 and back to pin 168. By the use of such an arrangement the entire armature structure 10 may be supported independent of or in addition to the support provided by the conventional structure extending from end flanges 52, 53 to the base 66 as depicted in FIG. 2. The use of a second set of pins arranged transversely to the first ensures that the armature structure 10 will be held fixed in space. In addition a third and fourth set of pins and straps mounted at the other end of armature structure 10 is used to provide more rigid support. Ovalizing strains which occur in the central part 22 or active length of the machine may be accommodated by the structure shown in FIGS. 1 and 2 in as much as armature structure 10 is supported only at the ends 52 and 53. The support structures 161, 167 shown in FIG. 9 are also able to accommodate ovalizing strains because of the spring like nature of the strap rigging between the pair of pins. Structures such as 161 and 167 are particularly advantageous since they provide a distributed attachment to armature structure 10, and do not interfere with or damage the structure of the outer torque shell 16 or any of the conductors or insulating layers contained therein.

Other embodiments will occur to those skilled in the art and are within the following claims:

What is claimed is:

1. A stator structure for a cryogenic electrical machine comprising:
    an inner support shell of electrically insulating material;
    a stator winding unit carried by and fixed to said inner support shell and including a central part in which the stator winding conductors extend axially along said inner support shell, two end parts each having a transverse section in which said conductors extend transversely to their axial direction, an intermediate section in which the conductors extend between a said end part and said central part, and an end section in which said conductors are interconnected in a predetermined pattern;
    an outer torque shell of electrically insulating material extending beyond said end sections and having transversely extending filaments surrounding and fixed to said stator winding unit for mechanically supporting and electrically insulating said stator winding unit from the frame of said machine;
    each of said end parts including end spacers for securing said conductors in the area of a said end section and being interconnected with said outer torque shell; and
    a torque member interconnected with said torque shell and with said end spacers, and an end member interconnected with said torque member and said inner support shell.

2. The stator structure of claim 1 in which said central part includes tapered elements lodged between said conductors to compensate for the increase in the space between said conductors with increasing radial distance each of said conductors being bonded to said tapered elements on either side of it and to adjacent ones of said shells, and bonding material being disposed between and around said conductors to bond them to each other.

3. The stator structure of claim 1 in which each of said conductors includes a plurality of conductor bundles, each of which includes a plurality of conductor strands covered with an insulating bonding material.

4. The stator structure of claim 1 in which said conductors in said transverse section extend helically about said structure.

5. The stator structure of claim 1 in which said conductors in said end sections are separated by spacer elements of electrical insulating material, and are bonded to said spacer elements, there being a number of layers of said conductors and said end spacers extending partially radially between said conductors in said end sections of the outer most layer.

6. The stator structure of claim 2 in which said outer torque shell filaments are looped about and engage said torque member.

7. A stator structure for a cryogenic electrical machine comprising:
- an inner support shell of electrically insulating material;
- a stator winding unit carried by and fixed to said inner support shell and including a central part in which the stator winding conductors extend axially along said inner support shell, two end parts each having a transverse section in which said conductors extend transversely to their axial direction, an intermediate section in which the conductors extend between a said end part and said central part, and an end section in which said conductors are interconnected in a predetermined pattern;
- an outer torque shell of electrically insulating material extending beyond said end sections and having transversely extending filaments surrounding and fixed to said stator winding unit for mechanically supporting and electrically insulating said stator winding unit from the frame of said machine; and
- a first pair of pins positioned on either side of said outer shell and an insulating strap forming a closed path wound about one pin at least once, wrapped at least once about said outer shell, wound about the other pin and wound again about said outer shell, and a second pair of pins positioned on either side of said outer shell and oriented transversely to said first pair of pins and an insulating strap forming a closed path wound about one pin, wrapped at least once about said outer shell, wrapped about the other pin, and wrapped again at least once about said outer shell, and mounting means for supporting said pins.

* * * * *